Figure 1:
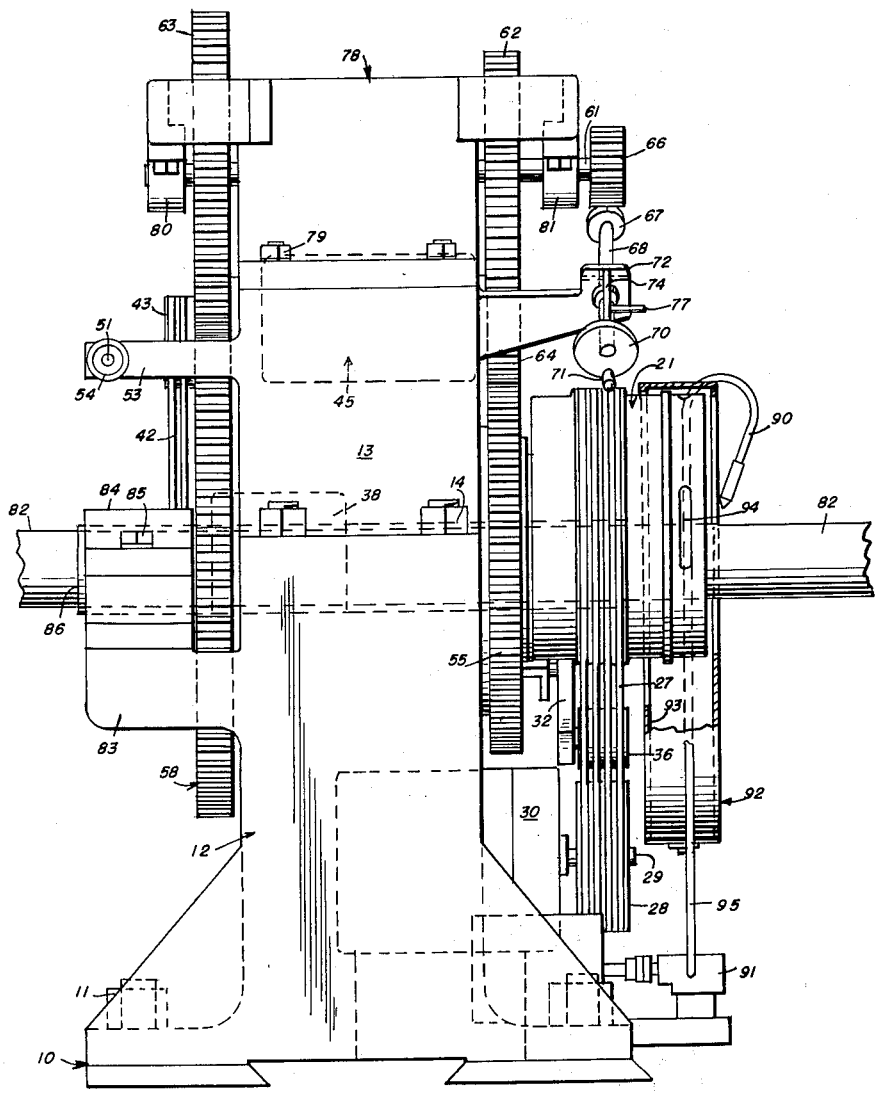

March 13, 1962  R. G. BROWNSTEIN  3,024,687
ROTARY CUT-OFF MACHINES
Filed July 13, 1960.  5 Sheets-Sheet 1

INVENTOR
RAYMOND GALILEO BROWNSTEIN

BY  Jacobi & Jacobi
ATTORNEYS

INVENTOR
RAYMOND GALILEO BROWNSTEIN

March 13, 1962

R. G. BROWNSTEIN 3,024,687

ROTARY CUT-OFF MACHINES

Filed July 13, 1960

5 Sheets-Sheet 3

INVENTOR
RAYMOND GALILEO BROWNSTEIN

BY *Jacobi & Jacobi*
ATTORNEYS

INVENTOR
RAYMOND GALILEO BROWNSTEIN
BY Jacobi + Jacobi
ATTORNEYS

United States Patent Office 3,024,687
Patented Mar. 13, 1962

3,024,687
ROTARY CUT-OFF MACHINES
Raymond Galileo Brownstein, 300 Fountain Ave.,
Ellwood City, Pa.
Filed July 13, 1960, Ser. No. 42,618
13 Claims. (Cl. 82—59)

This invention relates to machine tools and more particularly to a machine for cutting off lengths of round work and utilizing a disk cutter having internal teeth which operates to make a cut around the entire circumference of the work.

Heretofore, round tubular or bar stock has normally been cut into desired lengths by utilizing a reciprocating saw or in some instances, a circular saw and in many applications, such machines have been entirely satisfactory. However, in certain instances, the blade of a reciprocating saw may twist and move out of straight line thereby providing a cut which is not square with the axis of the work and also in the case of thin wall tubing, the use of a reciprocating or circular saw operating from one side of the tubing may result in distortion thereof. Furthermore, reciprocating or circular saws operating from one side only of the work are relatively slow and in the case of work of large diameter, such cut-off operations require an appreciable period of time.

It is, therefore, apparent that a cut-off machine in which the plane of the cut is accurately maintained at right angles to the axis of the work and in which the cutting action extends entirely around the circumference of the work provides accurate results and also affords a material reduction in the time required for the cut-off operation.

It is accordingly an object of the invention to provide a rotary cut-off machine for tubular or bar stock in which the cutting operation is performed entirely around the circumference of the work.

A further object of the invention is the provision of a rotary cut-off machine for tubular or bar stock, which machine utilizes a relatively thin disk cutter having internal teeth for cutting the work entirely around the circumference.

A still further object of the invention is the provision of a rotary cut-off machine utilizing a relatively thin disk cutter, the plane of which may be maintained at right angles to the axis of the work.

Another object of the invention is the provision of a rotary cut-off machine incorporating both manual and automatic means for feeding the cutter toward the work and for retracting the same therefrom.

A further object of the invention is the provision of a rotary cut-off machine for tubular or bar stock and which may be utilized for cutting off extremely short lengths of such stock.

A still further object of the invention is the provision of a rotary cut-off machine for tubular or bar stock and which will operate to provide an extremely accurate and rapid cutting operation.

Another object of the invention is the provision of a rotary cut-off machine for tubular or bar stock, such machine being of appreciably smaller size than conventional reciprocating or circular saw machines of the same capacity.

Figure 2:
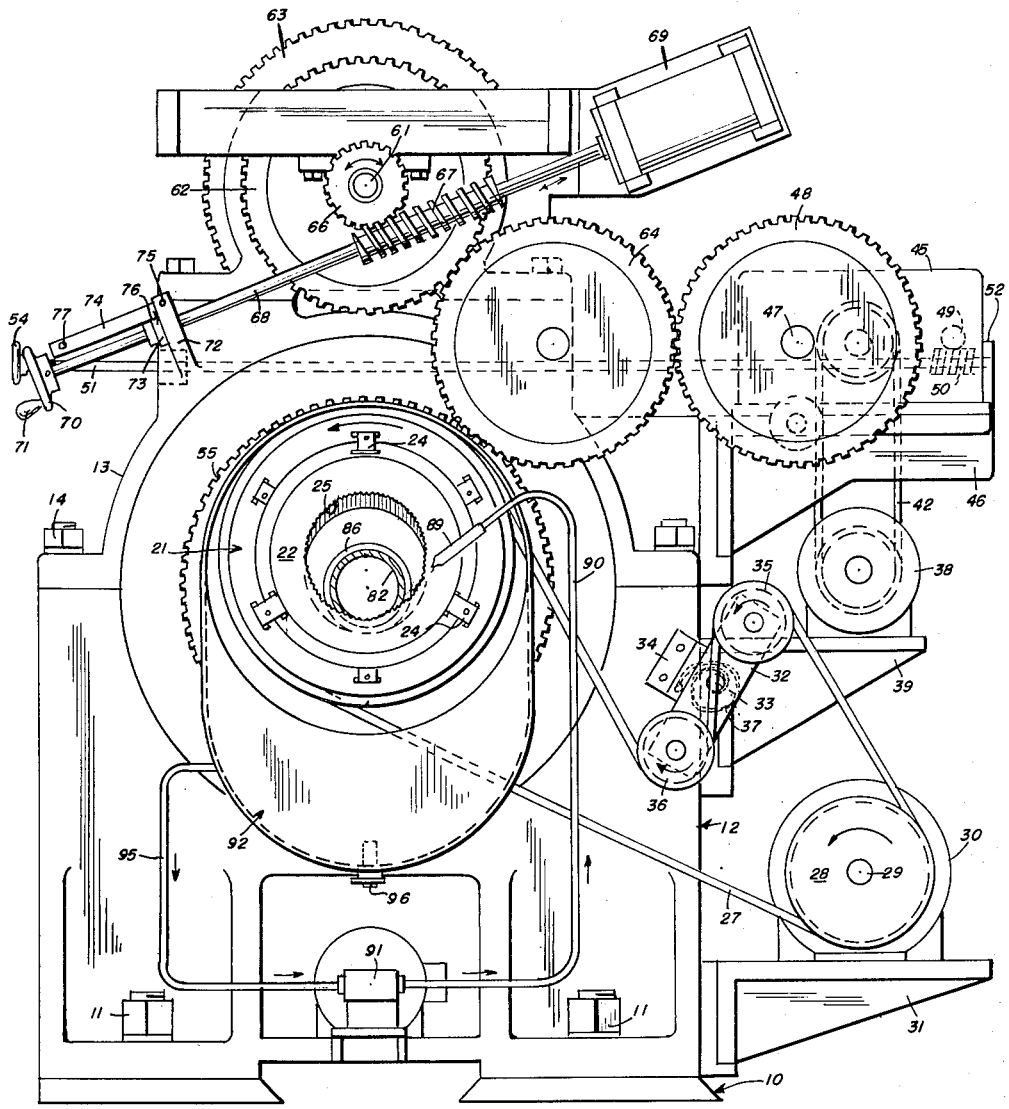
Figure 3:
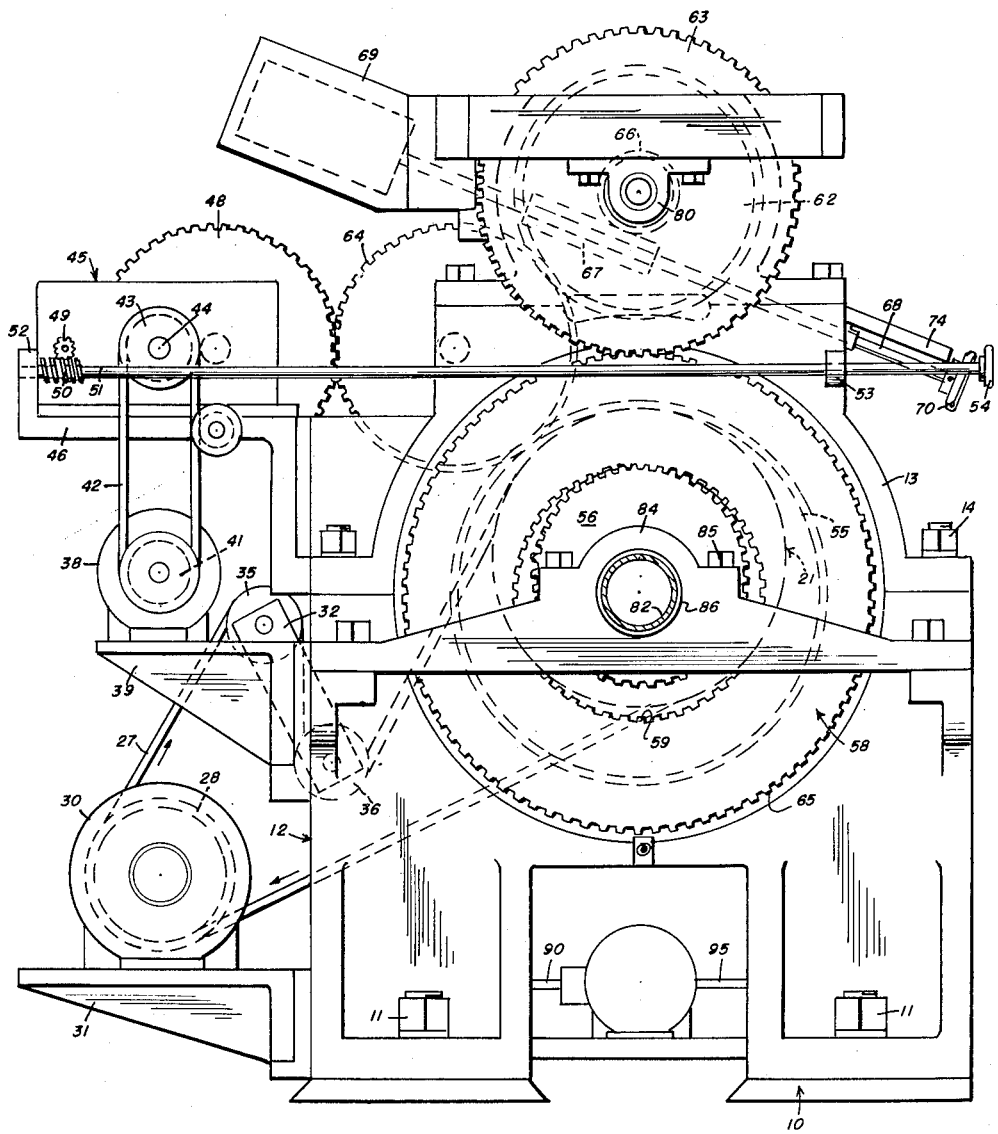
Figure 4:
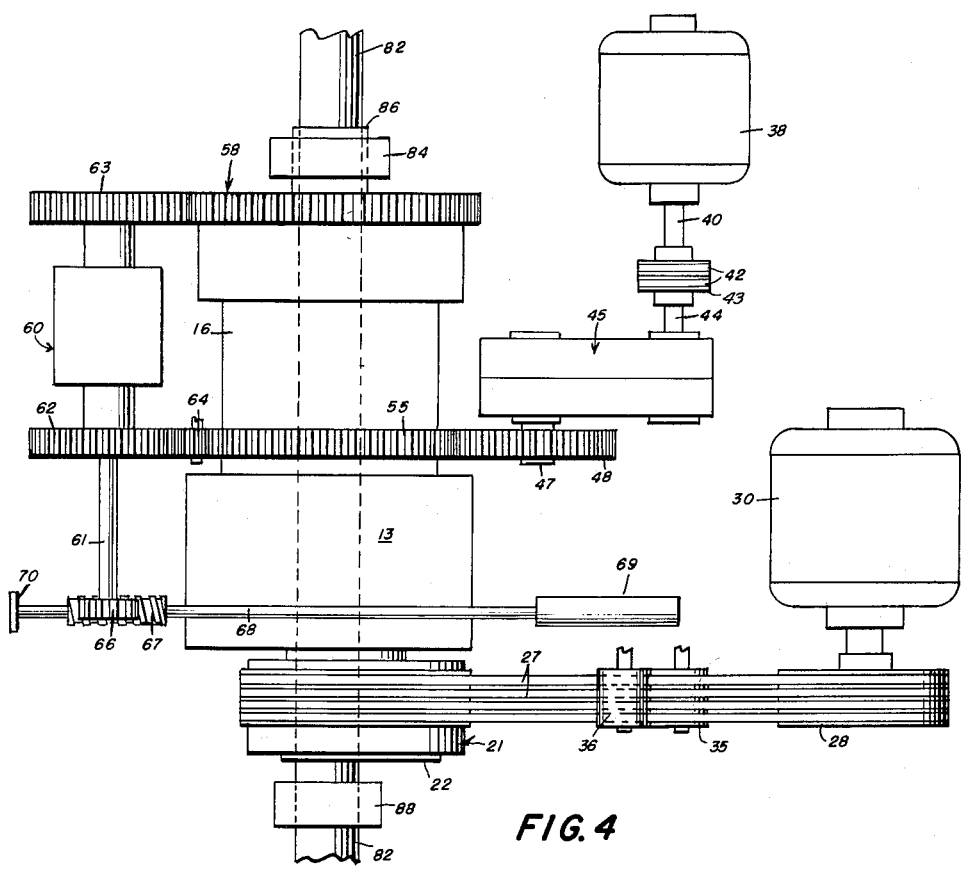
Figure 5:
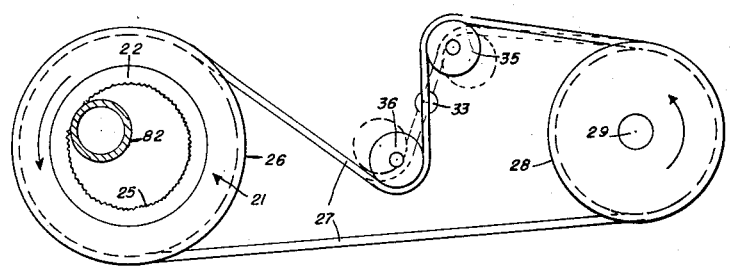
Figure 6:
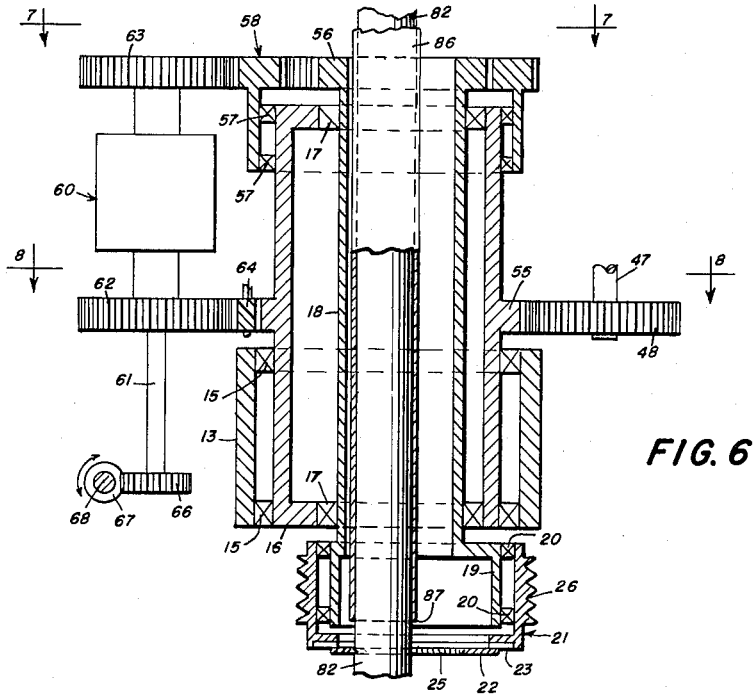
Figure 7:
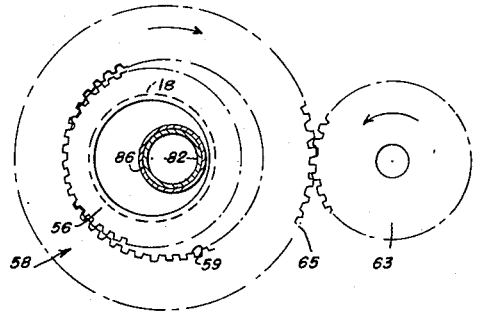

Further object and advantages of the invention will be apparent from the following description taken in conjunction with the accompanying drawings wherein:

FIG. 1 is a side elevational view of a rotary cut-off machine constructed in accordance with this invention;

FIG. 2 a front elevational view of the machine shown in FIG. 1;

FIG. 3 a rear elevational view of the machine shown in FIG. 1;

FIG. 4 a fragmentary top plan view showing the drive means for the cutter, as well as the drive means for rotating the cutter about the work and the feeding mechanism for feeding the cutter toward or away from the work;

FIG. 5 a diagrammatic fragmentary elevational view showing the drive means for the cutter and the manner of maintaining tension in the drive belt;

FIG. 6 a longitudinal sectional view showing the supporting structure for the cutter and the mechanism for rotating the same about the work and feeding the same toward and away from the work;

FIG. 7 a sectional view taken substantially on the line 7—7 of FIG. 6; and

Figure 8:
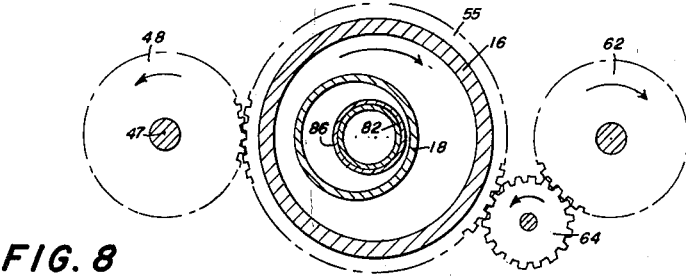

FIG. 8 a sectional view taken substantially on the line 8—8 of FIG. 6.

With continued reference to the drawings, there is shown a rotary cut-off machine constructed in accordance with this invention and which may well comprise a base 10 secured to a supporting surface by suitable fastening means 11 and extending upwardly from the base 10 is a frame 12. A bearing cap 13 is secured to the frame 12 by suitable fastening means 14 and secured in position by the bearing cap 13 are suitable anti-friction bearings 15 which serve to rotatably support an elongated horizontal sleeve 16. Mounted within the sleeve 16 adjacent the opposite ends thereof and eccentric to the axis of the sleeve 16 are suitable anti-friction bearings 17 which serve to rotatably mount an elongated hollow spindle 18 and it will be noted from an inspection of FIG. 6 that the spindle 18 projects from the opposite ends of the sleeve 16.

The front end of the spindle 18 carries a hollow head 19 which is disposed eccentrically to the axis of the spindle 18 and carried by the head 19 are suitable anti-friction bearings 20 which serve to rotatably mount a cutter carrier 21 on the head 19. With particular reference to FIGS. 2 and 6, it will be seen that a disk cutter 22 is secured to the forward face 23 of the carrier 1 by suitable clamping means 24 and the cutter disk 22 is provided with internal peripheral teeth 25 which are concentric with the head 19. It will be noted that the cutter disk 22 is relatively thin and, of course, such disk may be made of any desired material and the teeth 25 may be formed from the material of the disk 22, or such teeth may be formed of a hard alloy and secured to the disk 22 in any suitable manner, such as by brazing or the like.

In order to drive the cutter carrier 21 and the cutter disk 22, a multiple pulley 26 is provided on the cutter carrier 21 and the pulley 26 serves to engage a plurality of V belts 27 or other suitable drive means, which belts in turn engage a pulley 28 mounted on the power output shaft 29 of a drive motor 30 which may be supported on a shelf or bracket 31 secured to the frame 12. Suitable tension is maintained in the belts 27 by a belt tightening means consisting of a bar 32 pivotally mounted midway of the length thereof on a stud 33 carried by a bracket 34 secured to the frame 12. A plurality of V pulleys 35 are rotatably mounted adjacent one end of the bar 32, such pulleys 35 engaging the inner surfaces of the belt 27 and rotatably mounted on the opposite end of the bar 32 are a plurality of V pulleys 36 which engage the outer surfaces of the belts 27. The bar 32 and pulleys 35 and 36 carried thereby are yieldably urged in a direction about the pivot 33 by a spiral spring 37 or other suitable means to maintain tension in the belts 27 as the distance between the pulley 26 on the cutter carrier 21 and the drive pulley 28 on the motor 30 varies in a manner to be later described. The motor 30 operates to drive the cutter carrier 21 and cutter disk 22 carried thereby continuously in one direction about the axis of the head 19.

A second motor 38 is mounted on a shelf or other suitable support 39 carried by the frame 12 and fixed to the power output shaft 40 of the motor 38 is a pulley 41 engaging a belt 42 which in turn engages a pulley 43 fixed to the input shaft 44 of a variable speed transmission 45. The transmission 45 may be mounted on a shelf or bracket 46 carried by the frame 12 and secured to the power output shaft 47 is a gear 48.

The variable speed transmission 45 is conventional and the output speed thereof may be conveniently varied by means of a pinion gear 49 meshing with a worm gear 50 fixed to a shaft 51 rotatably mounted in a bearing 52 carried by the shelf or bracket 46 and a bearing 53 projecting from the bearing cap 13, the shaft 51 extending to the side of the machine and being provided with a hand wheel 54 for convenient manipulation by the operator to adjust the output speed of the variable speed transmission 45.

As best shown in FIGS. 4 and 6, a drive gear 55 is fixed to the sleeve 16 and meshes with the gear 48 to be driven thereby. A cutter feed gear 56 is fixed to the rear end of the spindle 18 and rotatably mounted by suitable anti-friction bearings 57 on the rear end of the sleeve 16 is an internal external gear 58, the internal teeth 59 of which meshes with the cutter feed gear 56 on the spindle 18.

A cutter feeding mechanism is provided which may include a differential 60 having a control shaft 61, an input gear 62 and an output gear 63. The differential 60 is conventional in every respect and it is not considered necessary to show the mechanical details thereof, it only being necessary to state that the control shaft 61 is fixed to a carrier which in turn rotatably supports pairs of meshing planet gears there also being a pair of sun gears meshing with the planet gears. One sun gear is coupled with the input gear 62, while the other sun gear is coupled to the output gear 63. The operation of the differential 60 will be later described. The input gear 62 meshes with an idler gear 64 rotatably mounted on the frame 12, the idler gear 64 also meshing with the drive gear 55 on the sleeve 16. The output gear 63 meshes with the external teeth 65 on the internal external gear 58. For convenience of illustration, the gear 48 is shown in FIGS. 4, 6 and 8 as meshing directly with the drive gear 55 on the sleeve 16 and the idler gear 64 is shown as disposed between the drive gear 55 and the input gear 62 of the differential 60. An entirely equivalent arrangement is shown in FIGS. 1, 2 and 3 in which the gear 48 meshes with the idler gear 64 which in turn engages the drive gear 55 on the sleeve 16 and the input gear 62 on the differential 60. For convenience, either arrangement of such gearing may be utilized and the results will be the same in either case.

A worm wheel 66 is fixed to the control shaft 61 of the differential 60 and the worm wheel 66 meshes with a worm gear 67 carried by a feed shaft 68 which is rotatably and slidably mounted on the frame 12. A fluid pressure cylinder 69 is mounted on the frame 12 and the pistons of the cylinder 69 are coupled to the feed shaft 68 for moving the same axially in either direction. A hand wheel 70 having a finger engaging knob 71 thereon is fixed to the shaft 68 in a position convenient to the operator for permitting rotation of the feed shaft 68. As best shown in FIG. 2, the feed shaft 68 extends through an ear 72 formed on the frame 12 and fixed to the feed shaft 68 at one side of the ear 72 is a collar 73. A latch bar 74 is pivotally mounted at 75 on the ear 72 and the latch bar 74 is provided with a notch 76 for receiving the collar 73 when the latch bar 74 is in the position shown in FIG. 2. In this position, engagement of the collar 73 in the notch 76 prevents axial movement of the feed shaft 68 and in this condition the feed shaft 68 may be rotated by the hand wheel 70 thereby causing the worm gear 67 to drive the worm wheel 66 and the control shaft 61 of the differential 60. When it is desired to permit axial movement of the feed shaft 68 by the fluid pressure cylinder 69, it is only necessary to raise the latch bar 74 to disengage the collar 73 from the notch 76 and at this time, the feed shaft 68 may be moved axially in either direction by operation of the fluid pressure cylinder 69. In order to permit convenient manipulation of the latch bar 74 there may be provided thereon a finger engaging knob 77. The differential 60 may be carried by an auxiliary frame 78 which is secured to the upper side of the bearing cap 13 by suitable screw threaded fasteners 79 and the auxiliary frame 78 may be provided with bearings 80 and 81 for receiving the control shaft 61 of the differential 60. In this manner the differential 60 is suitably supported with the input gear 62 meshing with the idler gear 64 and with the output gear 63 meshing with the external teeth 65 at the internal external gear 58. For convenience, the fluid pressure cylinder 69 may also be supported on the auxiliary frame 78.

In order to support a work piece 82 of tubular or bar stock within the spindle 18, there may be provided a bracket 83 mounted on the frame 12, the bracket 83 being provided with a clamping cap 84 secured to the bracket 83 by suitable fastening means 85, the clamping cap 84 serving to secure a tubular work support 86 in place and as clearly shown in FIG. 6, the tubular work support 86 projects inwardly of the spindle 18 in such a manner that the forward end 87 of the tubular work support 86 is disposed closely adjacent the inner side of the cutter disk 22. Also, if desired, a suitable support 88 may be mounted on the frame 12 or supported in any other desired manner for engaging the portion of the work piece 82 which projects outwardly of the spindle 18 and cutter disk 22.

Since considerable heat may be developed during the cutting operation and also, since it is desirable to provide a lubricant for the cutting teeth, a suitable lubricant and coolant may be supplied to the teeth 25 of the cutter disk 22 by means of a nozzle 89 directed toward the cutting teeth 25, the nozzle 89 being connected to a conduit 90 which in turn is connected to the outlet of a suitable pump 91 driven from any suitable power source. A hood 92 surrounds the cutter disk 22 and a portion of the cutter carrier 21 and it is to be noted that the lower portion of the hood 92 is closed to form a sump 93. In order to permit fluid to drain from the interior of the cutter carrier 21, there may be provided spaced apertures 94 in the carrier 21 and consequently, fluid entering the carrier 21 will drain through the apertures 94 into the sump 93 of the hood 92. The sump 93 may be connected through a conduit 95 to the intake of the pump 91 and as a result, cooling and lubricating fluid will be continuously re-circulated to cool and lubricate the cutting teeth 25 and the work piece 82. A drain 96 may be provided in the sump 93 for permitting convenient removal of the cooling and lubricating fluid when it is desired to replace the same with clean fluid.

In the operation of the cut-off machine of this invention, it is assumed that the motor 30 is operating to drive the cutter disk 22 continuously in one direction and that a work piece 82 has been positioned through the tubular work support 86 with the forward end of the work piece 82 projecting outwardly of the cutter disk 22. It is also assumed that the second motor 38 is operating and that the variable speed transmission 45 is adjusted to provide the desired output speed of the gear 48 and as a result, the sleeve 16 is continuously driven in one direction and through the idler gear 64 drives the input gear 62 of the differential 60. At this time, the feed shaft 68 is retained against axial movement by engagement of the collar 73 in the notch 76 of the latch bar 74, with the result that engagement of the worm gear 67 with the worm wheel 66 on the control shaft 61 prevents rotation of such control shaft 61, as well as the carrier of the differential 60. Consequently, the input gear 62 of the differential 60 will drive through the associated sun gear, the planet gears and the other sun gear with the result that the output gear 63 of the differential 60 will be driven, thereby driving the internal external gear 58 and through the engagement of the internal teeth 59, will drive the feed gear 56 and the spindle 18. In this condition, however, and with the control shaft 61 of the differential 60 held against rotation, the sleeve 16 and spindle 18 will rotate as a unit in the same direction. This will result in rotating the head 19 and cutter carrier 21 mounted thereon about the axis of the sleeve 16 and it is assumed that at this time, the cutter teeth 25 on the cutter disk 22 are out of engagement with the work piece 82.

When it is desired to begin a cutting operation, it is only necessary to manually rotate the feed shaft 68 by means of the hand wheel 70 which will result in turning the control shaft 61 thereby moving the carrier of the differential 60 to change the relationship between the output gear 63 and the input gear 62, this movement resulting in moving the spindle 18 and head 19 with respect to the sleeve 16. This movement will be about the axis of the spindle 18 and consequently, since the head 19 is eccentrically disposed with respect to the axis of the spindle 18, movement of the head 19 will result in moving the cutting teeth 25 into engagement with the surface of the work piece 82. During relative movement between the spindle 18 and the sleeve 16, such spindle and sleeve are also rotating about the axis of the sleeve 16 and consequently, the cutter disk 22 will be rotated about the work piece 82 thereby making a cut entirely around the circumference of such work piece. The feeding operation may be continued manually by operating the hand wheel 70, but in normal operation, an automatic feed is desired and for this purpose, it is only necessary to actuate the latch bar 74 to disengage the collar 73 from the notch 76 and to introduce fluid pressure to the cylinder 69, at which time the feed shaft 68 will move axially toward the left, as viewed in FIG. 2, and in this situation the worm gear 67 in engagement with the worm wheel 66 will operate as a rack to rotate the worm wheel 66 and control shaft 61 thereby continuously moving the spindle 18 with respect to the sleeve 16, thereby providing a continuous feed of the cutter disk 22 toward the work piece 82. Of course, during this automatic feeding operation, the sleeve 16 and spindle 78 are continuously rotating about the axis of the sleeve 16 thereby providing a continuous cut entirely around the circumference of the work piece 82 until such time as the work piece is completely severed. Upon completion of the cutting operation, the fluid pressure cylinder 69 may be operated in the opposite direction to move the feed shaft 68 toward the right as viewed in FIG. 2, thereby reversing the movement of the spindle 18 with respect to the sleeve 16 to retract the cutter disk 22 away from the work piece 82 and upon the feed shaft 68 reaching its original position, the latch bar 74 may again be actuated to engage the collar 73 with the notch 76 to lock the feed shaft 68 against axial movement.

It will be seen that by the above described invention there has been provided a rotary cut-off machine which will accomplish an extremely rapid cutting operation by reason of providing a cut entirely around the circumference of the work piece and furthermore, since the cutter disk may be relatively rigid and thin, relatively little stock is wasted and furthermore, the cut may be extremely accurate to provide a cut surface perpendicular to the axis of the work piece.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, a disk cutter mounted on said carrier, internal peripheral teeth on said cutter concentric with said head, a pulley on said carrier, a motor mounted on said frame and having a drive pulley, a belt connecting the pulley on said motor and the pulley on said carrier, yieldable take-up means mounted on said frame and engaging said belt to maintain tension therein for driving said carrier in all angular positions thereof, a drive gear mounted on said sleeve, a second motor mounted on said frame, a variable speed transmission coupled to said second motor, a gear on said transmission meshing with said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feet shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and tubular work support means carried by said frame and extending inside said spindle concentric with said sleeve to a point adjacent said cutter, whereby upon operation of said first motor said cutter will rotate about the axis of said head and upon rotation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

2. A rotary cut-off machine as defined in claim 1, in which a collar is fixed on said feed shaft, a latch bar pivotally mounted on said frame, said latch bar having a notch for receiving said collar in one position of said latch bar to prevent axial movement of said feed shaft, said latch bar being movable to disengage said notch from said collar to permit axial movement of said feed shaft by said fluid pressure cylinder.

3. A rotary cut-off machine as defined in claim 1, in which manually operable means is provided for preventing axial movement of said feed shaft, such manual means being operable to permit axial movement of said feed shaft upon operation of said fluid pressure cylinder.

4. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a pulley on said carrier, a motor mounted on said frame and having a drive pulley, a belt connecting the pulley on said motor and the pulley on said carrier, yieldable take-up means mounted on said frame and engaging said belt to maintain tension therein for driving said carrier in all angular positions thereof, a drive gear mounted on said sleeve, a second motor mounted on said frame, a variable speed transmission coupled to said second motor, a gear on said transmission meshing with said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and tubular work support means carried by said frame and extending inside said spindle concentric with said sleeve to a point adjacent said cutter, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

5. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a pulley on said carrier, a motor mounted on said frame and having a drive pulley, a belt connecting the pulley on said motor and the pulley on said carrier, yieldable take-up means mounted on said frame and engaging said belt to maintain tension therein for driving said carrier in all angular positions thereof, a drive gear mounted on said sleeve, a second motor mounted on said frame, a variable speed transmission coupled to said second motor, a gear on said transmission meshing with said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and work support means carried by said frame, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

6. A rotary cut-off machine comprising a frame, an elongated hroizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a pulley on said carrier, a motor mounted on said frame and having a drive pulley, a belt connecting the pulley on said motor and the pulley on said carrier, means to maintain tension in said belt for driving said carrier in all angular positions thereof, a drive gear mounted on said sleeve, a second motor mounted on said frame, a variable speed transmission coupled to said second motor, a gear on said transmission meshing with said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism, comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and work support means carried by said frame, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

7. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, a variable speed transmission coupled to said second motor, a gear on said transmission meshing with said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on the internal external gear, a worm wheel on said control shaft, a feed shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and work support means carried by said frame, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

8. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, means connecting said second motor and said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, a fluid pressure cylinder coupled to said feed shaft for moving the same axially in opposite directions, a hand wheel fixed to said feed shaft for turning the same and work support means carried by said frame, whereby upon operation of said first motor said cutter will rotate about the axis of said head and upon operation of said second motor and preventing rotation of said second control shaft said sleeve and spindle will rotate as a unit about the axis of said sleeve to move said cutter around the work and upon rotation of said control shaft said spindle will rotate with respect to said sleeve to feed said cutter toward or away from the work.

9. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, means connecting said second motor and said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, means coupled to said feed shaft for moving the same axially in opposite directions, a hand wheel fixed to said feed shaft for turning the same and work support means carried by said frame, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

10. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, means connecting said second motor and said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably and slidably mounted on said frame, a worm gear fixed to said feed shaft and meshing with said worm wheel, means coupled to said feed shaft for moving the same axially in opposite directions and a hand wheel fixed to said feed shaft for turning the same, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

11. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, means connecting said second motor and said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear, a worm wheel on said control shaft, a feed shaft rotatably mounted on said frame, a worm gear fixed to said feed shaft and meshing with said worm wheel and means for turning said feed shaft, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

12. A rotary cut-off machine comprising a frame, an elongated horizontal sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor mounted on said frame, means connecting said second motor and said drive gear to drive said sleeve, a cutter feed gear fixed to the rear end of said spindle, an internal external gear rotatably mounted on the rear end of said sleeve, the internal teeth of said last named gear meshing with said feed gear, cutter feeding mechanism comprising a differential having a control shaft, a power input gear coupled to said differential and a power output gear coupled to said differential, an idler gear meshing with said drive gear and with said input gear, said output gear meshing with the external teeth on said internal external gear and means to rotate said control shaft, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

13. A rotary cut-off machine comprising a frame, an elongated sleeve rotatably mounted on said frame, an elongated hollow spindle eccentrically mounted for rotation in said sleeve and projecting from opposite ends thereof, an eccentrically disposed hollow head on the front end of said spindle, a cutter carrier rotatably mounted on said head, an internal disk cutter mounted on said carrier, a motor for driving said carrier, a drive gear mounted on said sleeve, a second motor, means connecting said second motor and said drive gear to drive said gear, a cutter feed gear fixed to said spindle, an internal external gear rotatably mounted on said sleeve, the internal teeth of said last named gear meshing with said feed gear, cutter feeding mechanism comprising a differential having a control shaft, a power input gear and a power output gear, an idler gear meshing with said drive gear and with said input gear, said output gear meshing with the external teeth on said internal external gear and means to rotate said control shaft, whereby upon operation of said first motor said cutter will rotate about the axis of said head and upon operation of said second motor and preventing rotation of said control shaft said sleeve and spindle will rotate as a unit about the axis of said sleeve to move said cutter around the work and upon rotation of said control shaft said spindle will rotate with respect to said sleeve to feed said cutter toward or away from the work.

References Cited in the file of this patent

UNITED STATES PATENTS

| | | |
|---|---|---|
| 1,073,600 | Gorton | Sept. 23, 1923 |
| 1,507,235 | Hall | Sept. 2, 1924 |
| 2,038,254 | Worthington | Apr. 21, 1936 |
| 2,804,142 | Becker et al. | Aug. 27, 1957 |
| 2,905,243 | Rodder | Sept. 22, 1959 |